Patented Oct. 18, 1949

2,485,180

UNITED STATES PATENT OFFICE 2,485,180

LIQUID SULFUR DIOXIDE SOLVENT PROCESS FOR MAKING OLEFIN NITROSOCHLORIDES

Rufus K. Allison, Birmingham, Ala., assignor to Food Machinery and Chemical Corporation, a corporation of Delaware No Drawing. Application March 25, 1947, Serial No. 737,097

6 Claims. (Cl. 260—647)

This invention relates to a new and improved process for converting olefins to their nitrosochlorides.

Heretofore, olefins have been converted to their nitrosochlorides by dissolving them in alcohol such as methyl alcohol, or organic acids such as acetic acid, and treating them with nitrosyl chloride. These processes, however, produce unsatisfactory yields of the desired nitrosochloride, as a result of which they are generally conceded to be expensive and unsatisfactory.

It is an object of this invention to convert olefins to their nitrosochlorides by a process which is simple and inexpensive. A further object is to produce nitrosochlorides by a process involving the use of a new solvent medium which overcomes the disadvantages inherent in the prior art processes. Additional objects will become apparent from a consideration of the following description and claims.

In accordance with the present invention I have found that surprisingly high yields of olefin nitrosochlorides may be obtained by dissolving the olefin in liquid sulfur dioxide and passing nitrosyl chloride therethrough. In a more restricted sense my invention is concerned with the foregoing process wherein the solution of the olefin in liquid sulfur dioxide is maintained at a temperature below $-10°$ C. and preferably below $-40°$ C.

The invention may be more readily understood by a consideration of the following illustrative examples:

Example 1

A solution of 91.6 g. of d-limonene in 287 g. (200 cc.) of liquid sulfur dioxide was maintained in the temperature range of $-60°$ C. to $-70°$ C., with stirring, while 40 g. of nitrosyl chloride was bubbled in over a 0.5 hour period. The low temperature was maintained for an additional 0.5 hour while the mixture was stirred. The white solid was separated by vacuum filtration, and the filtrate was kept cold. The solid d-limonene nitrosochloride, was washed with 200 cc. of cold (at least $-60°$ C.) ether, and air dried; its weight was 64 g., representing a 47 per cent conversion of the limonene into its nitrosochloride.

The filtrate, which was kept cold, was combined with 83 g. of d-limonene and again 40 g. of nitrosyl chloride was bubbled in under the conditions described above. The solid, separated, washed, and dried as before, weighed 89 g., representing at 72 per cent conversion of the limonene.

Again the filtrate was combined with 83 g. of d-limonene and the process was repeated. The dry solid nitrosochloride weighed 105 g., representing an 86 per cent conversion of the limonene.

The over-all conversion was 67.5 per cent.

Analysis of the solid gave the following results:

|   | Calculated for $C_{10}H_{16}NOCl$ | Found | Found for a Similar Sample |
|---|---|---|---|
| C | 59.55 | 55.41; 55.34 | 59.18; 59.39 |
| H | 7.99 | 7.96; 8.01 | 7.81; 7.96 |
| S | 0 |  | 0.00  0.00 |

The nitrosochloride is further identified by dehydrochlorination to l-carvoxime, M. P. 70–72° C.

Example 2

A solution of 9 pounds of d-limonene in 3.5 gallons of liquid sulfur dioxide was maintained at $-45°$ C. to $-55°$ C., while 3.9 pounds of nitrosyl chloride was bubbled in over a 3.5 hour period. Then 2 pounds of d-limonene was added and 1 pound of nitrosyl chloride was bubbled in over a 2 hour period. The mixture was filtered by pressure and the filtrate was kept cold (below $-45°$ C.). The solid was washed with approximately 4 gallons of cold (below $-45°$ C.) acetone, and was air dried. The weight of the solid d-limonene nitrosochloride was 7.06 pounds, representing a 43.3 per cent conversion of the limonene.

The volume of the cold filtrate was brought back to 3.5 gallons by the addition of more liquid sulfur dioxide and then 9 pounds of d-limonene was added. The temperature of the mixture was held between $-45°$ C. and $-50°$ C., while 3.6 pounds of nitrosyl chloride was bubbled in over a 4.5 hour period. Two pounds more of d-limonene was added and the temperature was maintained while an additional 1.5 pounds of nitrosyl chloride was bubbled in over a 1.7 hour period. The mixture was filtered and the solid was washed and dried as before. The solid d-limonene nitrosochloride weighed 10 pounds, representing a 61.5 per cent conversion of the limonene.

The cold filtrate was made up to 3.5 gallons by the addition of liquid sulfur dioxide, then 11 pounds of d-limonene was added and, while the temperature was held between $-47°$ C. and $-53°$ C., 5.15 pounds of nitrosyl chloride was bubbled in over a 5.5 hour period. The mixture was filtered and the solid was washed and air dried as before. The dry solid d-limonene nitrosochloride weighed 9 pounds, representing a 55.3 per cent conversion.

The over-all conversion of d-limonene to its nitrosochloride, thus, is 53.4 per cent.

Example 3

A solution of 82 g. of cyclohexene in approximately 350 cc. of liquid sulfur dioxide was maintained between −45° C. and −55° C., with stirring, while 65.5 g. of nitrosyl chloride was bubbled in over a period of 1.25 hours. The mixture was stirred for an additional 0.25 hour and then 400 cc. of cold absolute ether was added. Following filtration, the precipitate was washed with 600 cc. of cold ether and air dried. The filtrate was evaporated to a thick slurry and the solid was sucked dry on a filter and then was washed with cold ether, and dried.

The combined weight of the solids was 95 g., representing a 64 per cent conversion of the cyclohexene, and its melting point was 147° C. A sample was recrystallized from alcohol and, after drying, melted at 153° C. A. Baeyer (Liebig's Annalen, 278 108 (1894)) gives a melting point of 152–153° C. for the nitrosochloride of cyclohexene.

Example 4

A solution of 45 g. of 8,9-dihydrolimonene in approximately 150 cc. of liquid sulfur dioxide was maintained in the temperature range of −45° C. to −55° C., with stirring, while 22 g. of nitrosyl chloride was bubbled in over 1.5 hours. The mixture was filtered and the precipitate was washed with cold methanol. After air drying, the solid weighed 43 g., representing a 64 per cent conversion of the dihydrolimonene, and melted at 90° C. A sample recrystallized from methanol melted at 95° C. Vavon (Compt. rend. 152 1677) gives a melting point of 95–96° C. for the nitrosochloride of 8,9-dihydrolimonene.

Example 5

A solution of 91 g. of d-limonene in 200 cc. of liquid sulfur dioxide was placed in a flask which was fitted with a cold finger-type reflux condenser. The condenser was cooled with a dry ice-trichloroethylene mixture. To the equipment was connected a flask containing 39.5 g. of nitrosyl chloride which was cooled to −70° C. The system was evacuated by a vacuum pump; the sulfur dioxide solution dropped to −62° C. as the pressure dropped to 25 mm. The nitrosyl chloride was allowed to warm up so that it vaporized into the system and was condensed by the reflux condenser. The nitrosyl chloride addition required 50 minutes. The pressure was held below 30 mm. by intermittent use of a vacuum pump so that the reaction temperature remained below −55° C. Following the completion of the addition of the nitrosyl chloride the mixture was filtered and the precipitate was washed with 200 cc. of cold sulfur dioxide. Then the mother liquor and wash were combined and allowed to evaporate nearly to dryness. The solid which crystallized was isolated by filtration and was washed with a small amount of acetone. The total weight of solid d-limonene nitrosochloride obtained was 74 g., representing a 55 per cent conversion of the d-limonene.

It is to be understood that the foregoing examples are illustrative merely of the present invention. They may be varied considerably with respect to the olefin reacted upon, the amounts of reactants and the reaction conditions, without departing from the scope of the invention. For example, in place of the olefins referred to above, or if desired in admixture therewith, other olefins may be employed. These olefins may be either cyclic or acyclic. Examples of the cyclic olefins are: cyclohexene, methyl cyclohexene, 8,9-dihydrolimonene, l-limonene, dipentene, α-pinene, β-pinene, and the like. Examples of the acyclic olefins are: octene-1, octene-2, styrene, stilbene, hexadecene, octadecene, and the like.

It is advisable that the olefin have but one double bond, although it is contemplated that olefins having a multiplicity of such bonds may be treated in accordance with the invention.

As mentioned previously, in place of a single olefin a plurality of olefins may be employed. This is particularly advantageous where it is desired to avoid the cost of separating one olefin from a closely related homolog. In such instances the mixture may be reacted in the manner referred to previously and the resulting product will be a mixture of the corresponding nitrosochlorides.

While this invention is applicable to olefins generally it is particularly advantageous for the treatment of cyclic olefins, especially olefins of the terpene group. Its preferred embodiment, as is evident from the above examples, is the treatment of limonene, particularly d-limonene, in order to convert it to the corresponding limonene nitrosochloride.

The yield of nitrosochloride is substantially improved by reducing the temperature at which the reaction is conducted. As a general rule, it is advisable to employ temperatures below −10° C., and preferably below −40° C., for this purpose. The liquid sulfur dioxide solution of olefin may be maintained at temperatures of the foregoing order by means of any suitable refrigeration method. I have found that a particularly advantageous manner of accomplishing this is to employ the liquid sulfur dioxide as a refrigerating medium. This is exemplified by Example 5. In accordance with this example the liquid sulfur dioxide solvent is boiled at subatmospheric pressure to obtain the desired low temperature. The heat of reaction between d-limonene or other olefin and nitrosyl chloride is substantial, but this is dissipated as the latent heat of vaporization of the sulfur dioxide. In this preferred system refrigeration is applied only at the surface of the reflux condenser, and the condensed sulfur dioxide is then allowed to return to the reaction mixture. By lowering the boiling point of the liquid sulfur dioxide through the use of diminished pressure the efficiency of this system is substantially improved. Example 5 refers to a pressure of 25 mm. but it is to be understood that this pressure may be varied widely without sacrificing the benefits of this expedient.

By means of the present invention a simple and inexpensive process is available for the conversion of olefins to their nitrosochlorides. This system is dependent upon the employment of a new solvent, which so far as I am aware has never been suggested for this reaction. The unusual effectiveness of this solvent in the reaction under consideration is substantially enhanced by the other expedients referred to above.

As many apparently widely different embodiments of this invention may be made without departing from the spirit and scope hereof, it is to be understood that the invention is not limited to the specific embodiments hereof except as defined in the appended claims.

I claim:

1. A process which comprises dissolving a cyclic olefin in liquid sulfur dioxide, maintaining the solution at a temperature below −10° C., passing nitrosyl chloride therethrough, and thereafter separating the resulting nitrosochloride therefrom.

2. A process which comprises dissolving a terpene olefin in liquid sulfur dioxide, maintaining the solution at a temperature below —40° C., passing nitrosyl chloride therethrough, and thereafter separating the resulting nitrosochloride therefrom.

3. A process which comprises dissolving limonene in liquid sulfur dioxide, maintaining the solution at a temperature below —10° C., passing nitrosyl chloride therethrough, and thereafter separating the resulting limonene nitrosochloride therefrom.

4. A process which comprises dissolving d-limonene in liquid sulfur dioxide, maintaining the solution at a temperature below —40° C., passing nitrosyl chloride therethrough, and thereafter separating the resulting d-limonene nitrosochloride therefrom.

5. The process of claim 1 wherein the solution is maintained at reduced temperature by vaporizing under subatmospheric pressure the sulfur dioxide in the solution, and thereafter condensing said sulfur dioxide vapors and returning the condensate to the solution.

6. The process of claim 4 wherein the solution is maintained at reduced temperature by vaporizing under subatmospheric pressure the sulfur dioxide in the solution, and thereafter condensing said sulfur dioxide vapors and returning the condensate to the solution.

RUFUS K. ALLISON.

REFERENCES CITED

The following references are of record in the file of this patent:

UNITED STATES PATENTS

| Number | Name | Date |
|---|---|---|
| 2,417,675 | Beckham | Mar. 18, 1947 |

OTHER REFERENCES

Tilden et al., "Isomeric Nitroso-terpenes," Jour. Chem. Soc. (London), vol. 16, (U. S.) 1877, pt. I, pages 554 to 561.

Tilden et al., "Action of Nitrosyl Chloride on Unsaturated Compounds," Jour. Chem. Soc. (London), vol. 65, pages 324 to 334.